United States Patent Office 3,093,403
Patented June 11, 1963

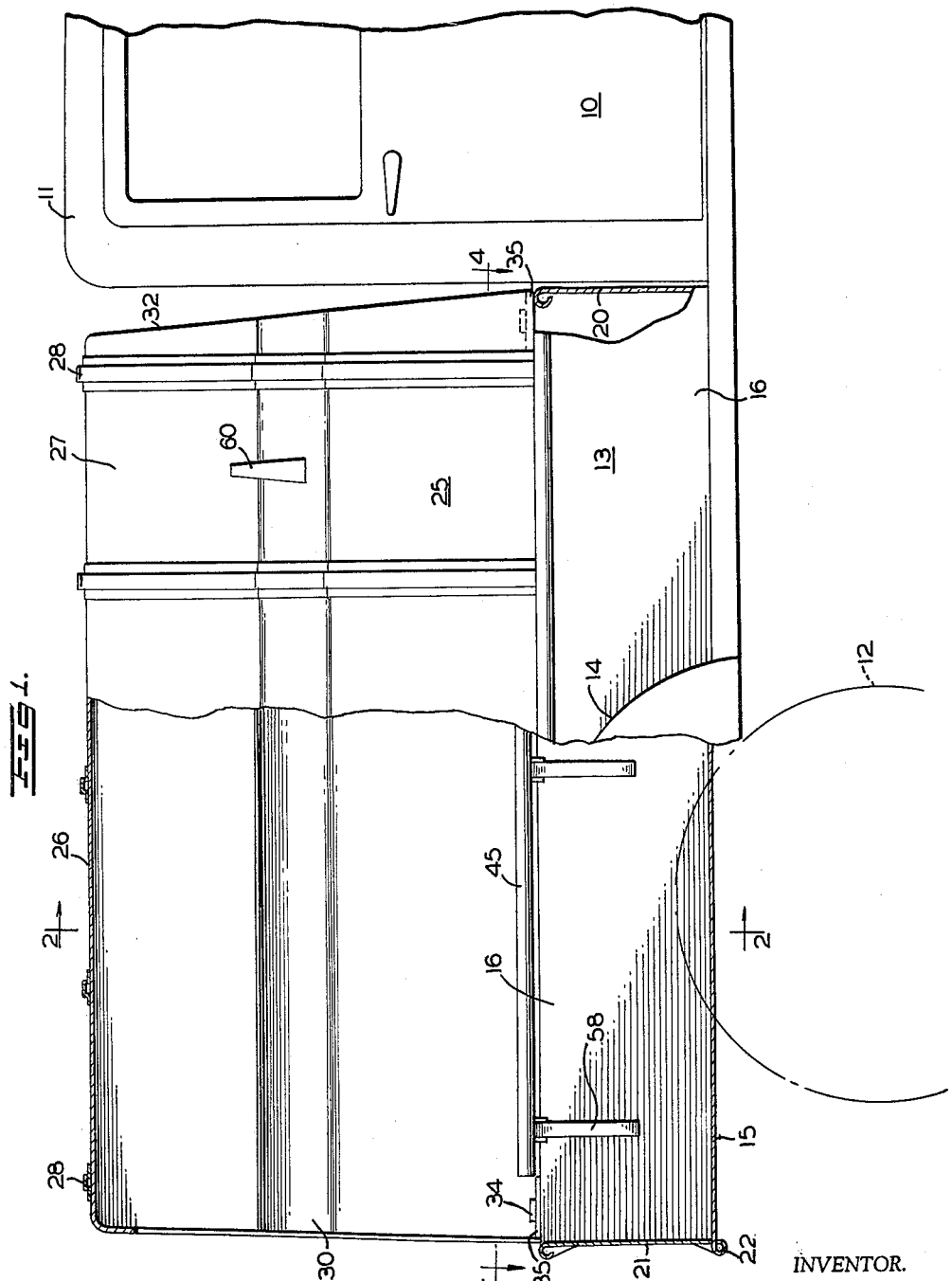

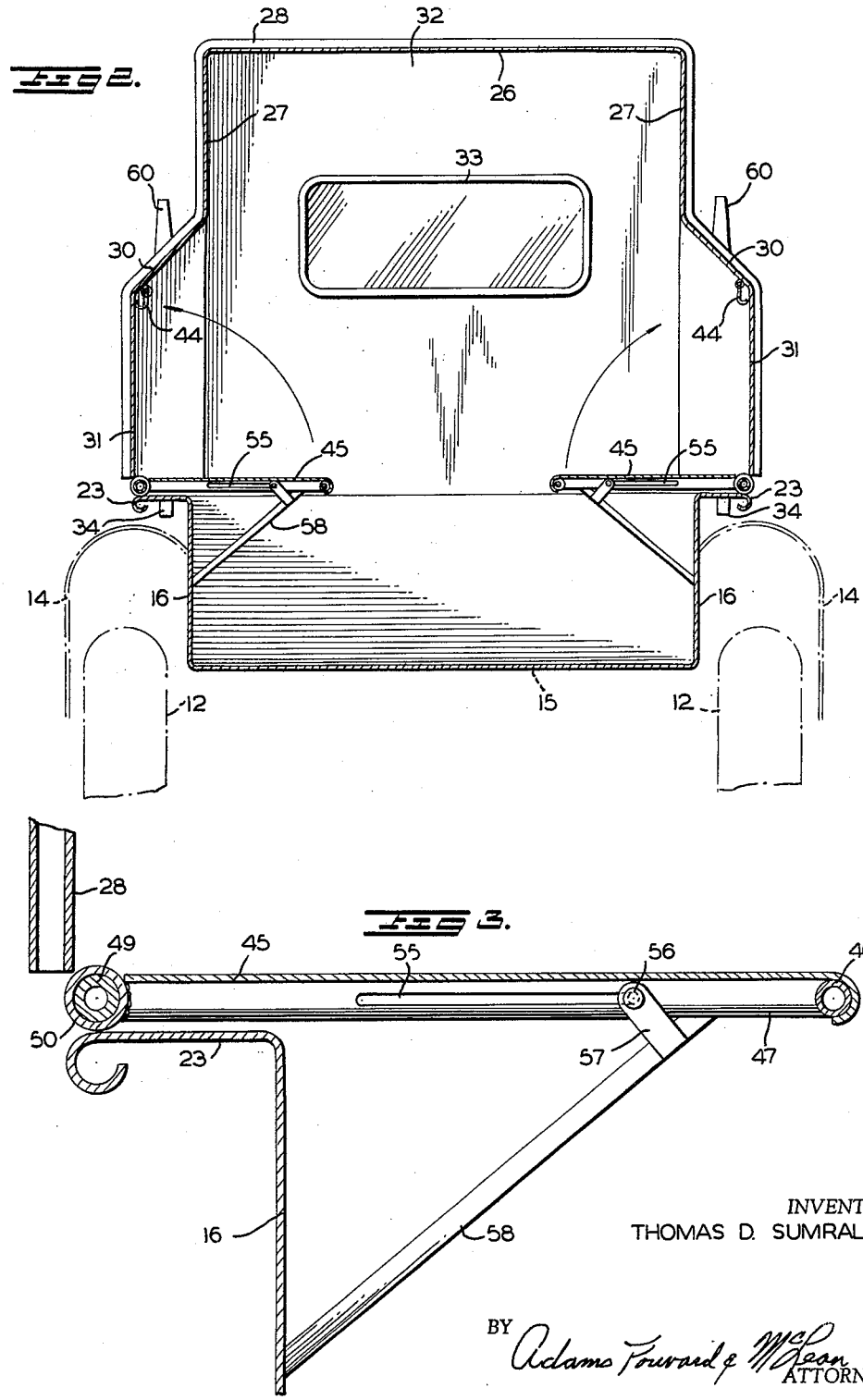

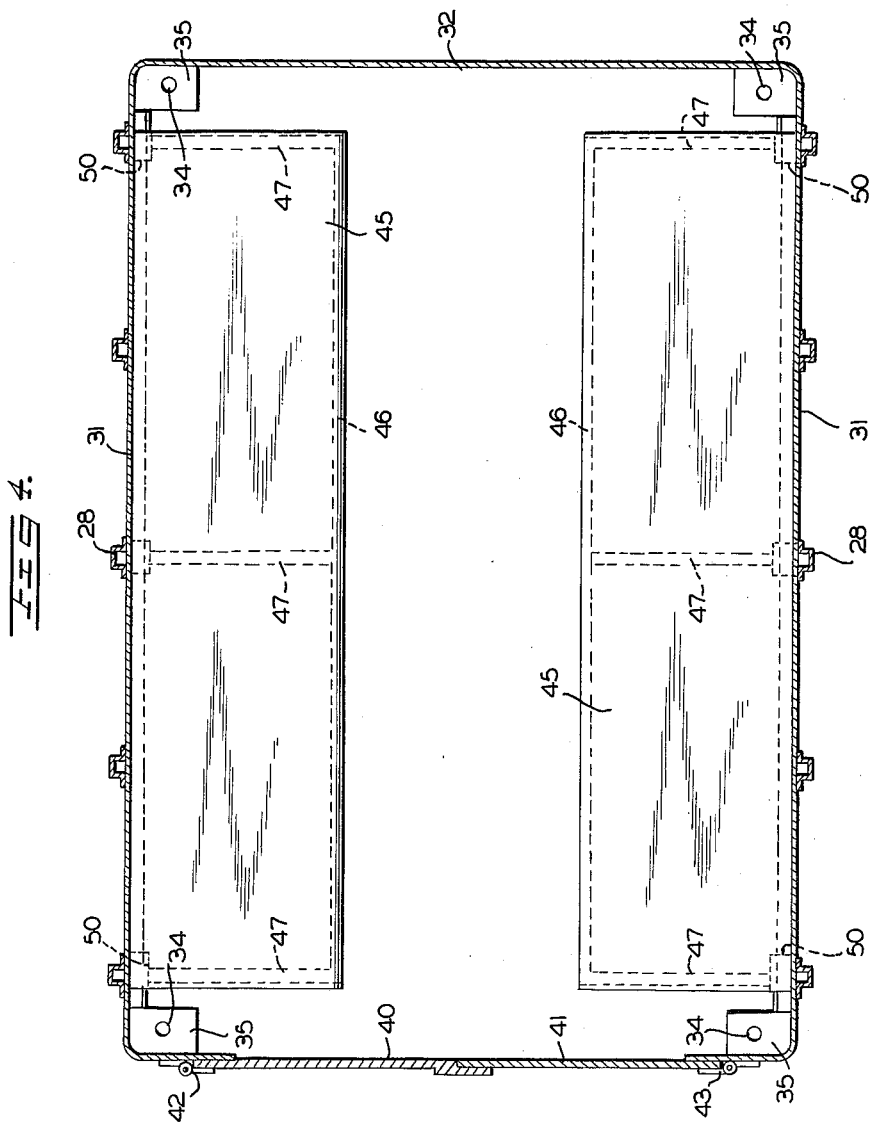

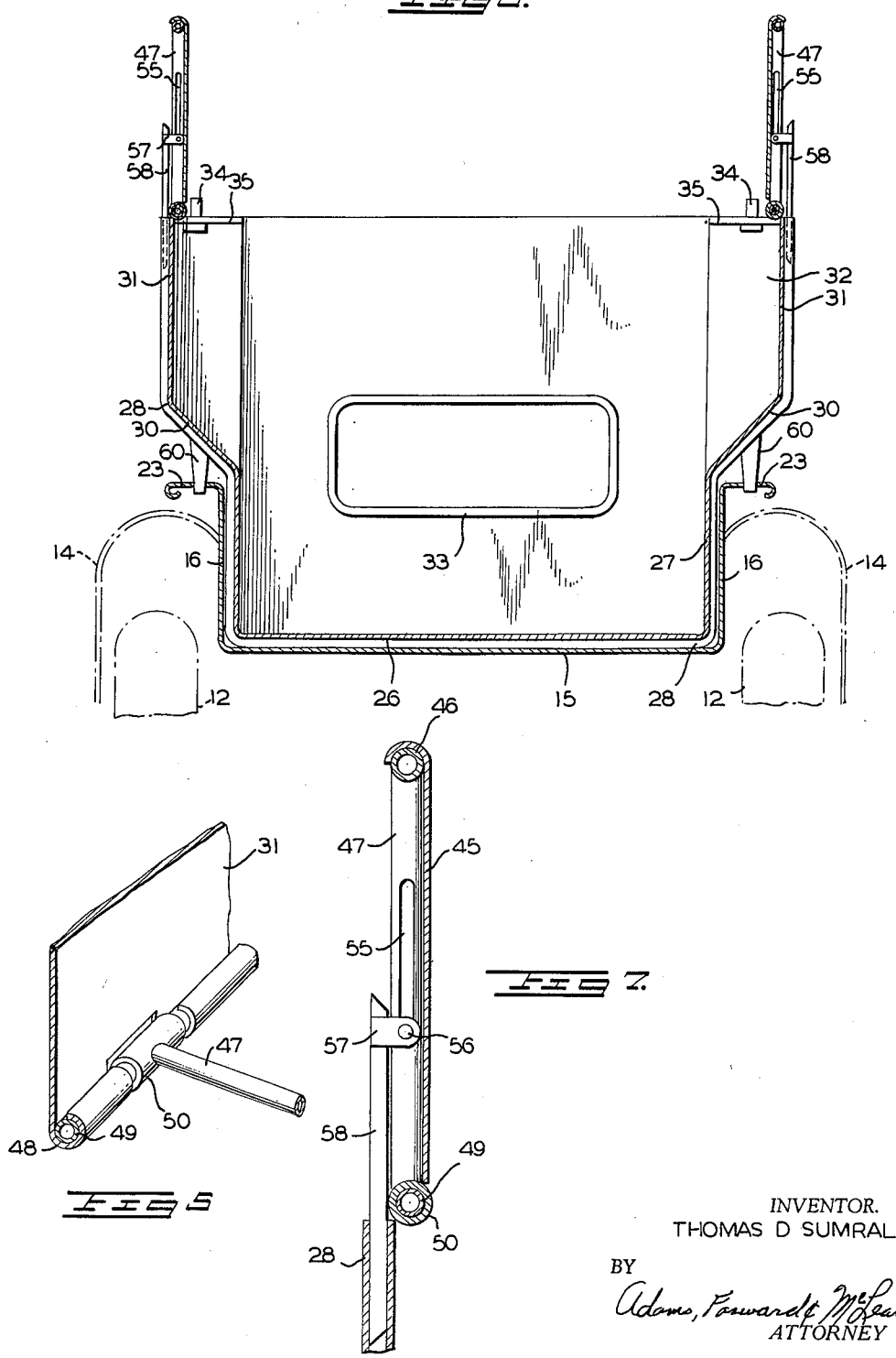

3,093,403
CONVERTIBLE VEHICLE BODY
Thomas D. Sumrall, 2976 Woodside Drive,
Jackson, Miss.
Filed Apr. 28, 1959, Ser. No. 809,522
12 Claims. (Cl. 296—10)

This invention relates to a vehicle body which is convertible to positions facilitating the transportation of either cargo or passengers.

There arise many situations in which a truck needs a specially designed body to accomplish a given function. It is, of course, very costly to have a separate truck, or even truck body, to perform only one specific service. This is particularly true if the truck cannot be used continuously in such service. In agricultural areas, for example, a single truck may have to be employed in various capacities and thus spend only a given portion of its time in a single service. Also, the truck may have to shift from one function to another several times a day yet a given truck body may be unsuitable for one or more of these services and frequently a compromise on all must be made. These and other factors establish a great need for truck bodies which can be readily converted to special positions to enable better performance of several services.

The situation arises where a truck must be used to carry workers or other passengers over substantial distances which for comfort and safety requires truck bodies having seating facilities with adequate and comfortable leg room. Between times when the truck is used for carrying people it must, of course, be employed in other useful services. Such services frequently require the hauling of bulky cargoes which cannot be readily loaded, or even unloaded, from the end of the truck, i.e. they are more readily handled from the top. Yet, if the truck be adapted for passengers it will, in many cases, need a hard, serviceable body top which, of course, makes top loading difficult if not impossible. Moreover, the seats provided for the passengers will usually prevent or materially deter the hauling of any bulky cargo.

In the present invention I have overcome these and other difficulties by constructing a truck body which can be converted easily from accommodations for passengers, for instance, seated under comfortable conditions in a weather-protected manner, to the transportation of cargo, even bulky, free-flowing materials. The seats provided for passenger service not only do not unduly hinder the hauling of cargo but indeed can actually aid in the latter function. In addition, the cargo can be loaded and/or unloaded from the top of the body and handled essentially as in a truck body built exclusively for carrying light, bulky cargoes. These and other advantages are made possible in this invention which is directed to a truck body especially usable in the upright position for transporting seated people and in the inverted position for hauling cargo. The seats can also be placed in a stored position for hauling cargo without reversing the truck body and most advantageously upon inversion of the body the seat construction is adaptable to aid in carrying greater quantities of cargo.

A more complete understanding of my invention and its advantages can be obtained by reference to the following description and the drawings in which:

FIG. 1 is a side view, with parts broken away, of a portion of a truck equipped with my convertible vehicle body used as a cover for a truck bed;

FIG. 2 is a cross-sectional view taken along the lines 2—2 of FIG. 1;

FIG. 3 is a close-up cross-sectional view of a seat construction attached to my vehicle body;

FIG. 4 is a cross-sectional plan view of the seat construction taken along lines 4—4 of FIG. 1 with the body not mounted on the truck bed;

FIG. 5 is a detailed view of a hinge arrangement for the seats;

FIG. 6 is a cross-sectional view similar to FIG. 2 except that the vehicle body is in the inverted position in which it serves to retain cargo in the truck; and FIG. 7 is a close-up sectional view of the upper portion of the vehicle body sides of FIG. 6 with the seat construction of the vehicle body in position to cooperate in holding the truck's cargo.

In the drawings, FIG. 1 shows a truck 10 having a forward cab 11, wheels 12 at each side of the rear of the truck bed 13 (the corresponding front wheels are not shown), and fenders 14 overlying the wheels. The truck bed has a generally flat bottom 15 and opposed side walls 16 extending upwardly from bottom 15. Truck bed 13 is also equipped with a front wall 20 connecting the forward ends of bottom 15 and side walls 16. Usually, front wall 20 is the same height as side walls 16 and the top of wall 20 can be beaded over for strength. At the rear, tail gate 21 closes the end of the truck bed formed by the rear ends of bottom 15 and side walls 16. Tail gate 21 is hinged to bottom 15 at 22 so that the gate can move downwardly for opening the truck bed. The tail gate can be latched in closed position and usually is the height of side walls 16. Tail gate 21 can also have its upper end beaded over for strength.

In the pick-up truck illustrated the side walls 16, front wall 20 and tail gate 21 extend vertically from bottom 15 a distance of about ¼ to ⅔ the height of cab 11, but, of course, this can be varied as desired. The upper ends of walls 16 turn outwardly as projections or flanges 23 over fenders 14 and wheels 12. In the drawings, flanges 23 are horizontal as preferred, but they can be at an angle to the horizontal. The outward ends of flanges 23 are beaded for strength. In the usual truck, the flanges 23 are provided to strengthen the bed and to help retain or support cargo, and they are particularly useful in my invention as supports for the convertible vehicle body in either of its positions.

FIGS. 1 to 5 show the vehicle body 25 in the position normally considered as upright. The body has a generally horizontal top 26 with side walls 27 connected to each side of the top. The top and side walls are reinforced by several longitudinally-spaced supporting channels or strengthening ribs 28. In the embodiment illustrated, the channels are on the outside of the vehicle body to present a smooth inner surface which provides for less obstructions to the occupants of the truck when the body is in the upright position. Also, when the body is inverted the smooth inner surface facilitates the loading and removal of cargo. The length and overall width of the upper portion of the vehicle body, i.e. the outside dimensions of the top and the first portions of the side walls, are such that the upper or first portion of the body fits within or complements the inner dimensions of the truck bed so that the body can be rested in the inverted position of FIG. 6.

In order to provide greater cargo space and seating capacity and comfort, walls 27 extend outwardly below their first portions at wall portions 30 and then downwardly at wall portions 31 so that the width of the body at the ends of wall portions 31 approximates that of the bed taken from the outside ends of flanges 23, i.e. the ends of wall portions 31 approximately overlie or are substantially in line with the outer ends of flanges 23. For greatest sitting comfort, the height of wall portions 31 is such that the backs and heads of the sitting occupants can rest against wall portions 31. However, this will be controlled by the relative dimensions of the truck bed and the body, and it is only necessary for the distance between the seats and the body top to be sufficient to accommodate the seated people. As illustrated, the vehicle body has a front wall 32 closing the forward ends of side walls 27 and top 26 and is provided with a window 33. The front wall 32 shields riders against the wind, adds strength to the vehicle body and serves as a cargo retainer even when in the inverted position of FIG. 6. If desired, the lower end of wall 32, see FIG. 2, could extend down into the truck bed adjacent wall 20, and in this case the extension could help hold the body on the bed when the latter is in the position of FIG. 1 and serve to retain cargo when the bed is in the position of FIG. 6. However, this last function can be performed by the upper portion of the truck cab especially when as shown in the drawings, the upright or inverted body is approximately the same height as the cab. Thus, although wall 32 is highly desirable, it may not be necessary. To aid in holding the upright vehicle body on the bed the four corners of the flanges 23 have holes in which are inserted cooperating studs or bolts 34 of the body. Bolts 34 are mounted on plates 35 in the lower corners of the vehicle body.

The rear of the vehicle body can be left open, but I prefer to close the end of the body formed by side walls 27 and top 26 by doors 40 and 41 hinged to the body at hinges 42 and 43, respectively. In effect, the doors form a rear wall when closed. The lower ends of the doors can terminate at the top of tail gate 21, but the doors can fit inside the closed tail gate and extend to truck bed bottom 15. The latter construction could be advantageous in retaining cargo when the truck body is in the inverted position of FIG. 6.

My vehicle body could be used without seats but in order to afford comfort and leg room for passengers, seats are provided in the greatly preferred form of the invention. At the lower ends of wall portions 31, I have hinged seats 45 which extend longitudinally of the body and which can move from a stored position inside and against or adjacent wall portions 31, see FIG. 2, and be held there as by simple spring hooks 44, to a position substantially in line with wall portions 31 where the seats serve as cargo-retaining extensions, see FIG. 6. The seats can be mounted on pipe frames 46 having end and middle cross-supports 47. The ends of supports 47 adjacent wall portions 31 serve to hinge seats 45. For instance, the lower end of wall portion 31 is beaded inwardly at 48 to surround pipe 49, see FIG. 5, and hold the latter against turning. Supports 47 terminate in cross-pipes 50 which pivot around pipes 49.

Transverse cross-supports 47 have a longitudinal slot 55 which is transverse to the body and underlies the seats and which receives bolt 56, the latter being loosely held in the slot to permit pivoting and sliding movements. Bolt 56 is firmly attached to support stub 57 which is rigidly mounted generally perpendicular to support 58. When the vehicle body is in the upright position, the seats 45 can be lowered to a substantially horizontal position where supports 58 contact the inside of truck bed side walls 16 and cross-supports 47 on which the respective supports 58 are mounted. The seats are, thereby, held in operative position overlying the flanges 23 which they can contact, if desired. In this situation, bolt 56 is at a first end of slot 55 away from the hinged end of the seat. The vehicle body could have seats only on a single side, but for maximum advantages, seats are employed at both sides.

FIGS. 6 and 7 show the vehicle body in the inverted, cargo-carrying position. I prefer that channels 28, top 26 and side walls 27 be sized to fit or rest snugly within the truck bed, with the sides 27 turning outwardly at wall portions 30 above the top of the truck bed walls 16. If desired, the body can be held in the truck bed by spikes 60 mounted generally vertically on the outside of wall portions 30 and positioned to extend through cooperating holes in flanges 23. Since channels 28 are on the outside of the vehicle body, the latter has a smooth inner surface to aid in loading and unloading cargo.

A main purpose of providing my convertible truck body is to make the truck readily adaptable for carrying relatively large volumes of light cargo such as cotton and for loading and unloading from the top. To increase the effective cargo-space, the seats of the vehicle body can be used as side extensions. Thus, seats 45 can be pivoted until they are in line with wall portions 31 and extend upwardly as in FIGS. 6 and 7. Supports 58 can then be inserted into channels 28 to hold the seats in raised positions. In this situation, supports 58 lie adjacent cross-supports 47 for more strength and bolt 56 is advanced to the second end of slot 55 which is nearer to the hinged end of seat 45.

It is seen that I have provided a simply-constructed, highly-useful vehicle body which is readily converted to to facilitate carrying passengers or cargo. Having described my invention:

I claim:

1. A convertible vehicle body which comprises a closed top, an open bottom and side walls extending from said top, said side walls having adjacent said top first portions whose outside dimensions permit upon inversion of said body, close insertion within the respective side walls of an open top truck bed, seating means pivotally attached to a body side wall, said seating means having support means for holding said seating means in a substantially horizontal position vertically spaced from said body top a sufficient distance to accommodate the body portion of seated human passengers between said seating means and said body top, said side wall being stationary on said body and serving as a back to said seating means, said seating means being pivotable towards said open bottom to a position forming extension of its respective said side wall when said body is in inverted position, means for holding said seating means in said extended position, and said seating means also being pivotable from the horizontal to a storage position towards said closed top and adjacent its respective said body side wall.

2. A convertible vehicle body which comprises a top, an open bottom and side walls extending from said top, said side walls having adjacent said top first portions whose outside dimensions permit, upon inversion of said body, insertion within the respective sides of a truck bed, second side wall portions being outwardly from their respective said first wall portions, seating means attached to said second wall portions and being movable to a storage position adjacent the inside of said second wall portions, said seating means having support means for holding said seating means in a substantially horizontal position vertically spaced from said first portions to accommodate seated passengers adjacent said second portions and outwardly of their said respective first portions, said seating means being movable to a position forming extensions of said side walls towards said open bottom, and means on the outside of said side walls for holding said support means in extended position.

3. A convertible vehicle body which comprises a closed top, an open bottom and side walls extending from said top, said side walls having adjacent said top first portions whose outside dimensions permit, upon inversion of said body, close insertion within the respective side walls of an open top truck bed, second body side wall portions being positioned outwardly from their respective said first portions and outwardly of said truck bed side walls, seating means movably attached to a said second side wall portion, said seating means being movable from a storage position adjacent to its respective said second portion to a substantially horizontal position extending inwardly beyond its respective truck bed side wall at approximately the top of said truck bed side wall and vertically spaced from its respective said first wall portion a sufficient distance to accommodate the body portion of seated human passengers adjacent its said respective second portion and outwardly of its said respective first portion and outwardly of its respective truck bed side wall, and upon inversion of the body said top and side walls forming a cargo carrier, said second side wall portion to which said seating means is attached being stationary and serving as a back to said seating means.

4. The body of claim 3 having a front wall and door means forming a rear wall.

5. A convertible vehicle body which comprises a top, an open bottom and side walls extending from said top, said side walls having adjacent said top first portions whose outside dimensions permit, upon inversion of said body, insertion within the respective sides of a truck bed, second side wall portions being outwardly from their respective said first wall portions, seating means pivoted to said second wall portions, said seating means having supports for holding said seating means in substantially horizontal positions for accommodating passengers, slots in the underside of said seating means, said supports having pivotal attachments in said slots and being capable of holding said seating means substantially horizontal by contact with the inside of a truck bed when said pivotal attachments are at a first end of said slots, and longitudinally spaced strengthening supports enclosing said top and side walls, said seating means being movable from a storage position adjacent said second wall portions to a position forming extensions of said side walls, said seating means supports being insertable into said longitudinally-spaced supports by moving said pivotal attachments to the second end of said slots to secure said seating means in extended position.

6. A truck which comprises an open top truck bed having a bottom and vertically positioned side walls with outward projections at their upper portions, a convertible body on said bed having a closed top, an open bottom and side walls extending from said top, said body side walls having adjacent said top first portions whose outside dimensions permit, upon inversion of said body, close insertion within the respective side walls of said truck bed, second portions of said body side walls being positioned outwardly from their respective said first portions and outwardly of said truck side walls, said second portions resting on said side wall projections when said body is upright to place said body second side wall portions outwardly of said truck bed side walls, and upon inversion of said body said top and side walls forming a cargo carrier, said body when in upright position providing a space extending from the truck bed to said body top.

7. A truck which comprises an open top truck bed having a bottom and vertically positioned side walls with outward projections at their upper portions, a convertible body on said bed having a closed top, an open bottom and side walls extending from said top, said body side walls having adjacent said top first portions whose outside dimensions permit, upon inversion of said body, close insertion within the respective side walls of said truck bed, second portions of said body side walls being positioned outwardly from their respective said first portions and outwardly of said truck side walls, said second portions resting on said side wall projections when said body is upright, seating means movably attached to a said second side wall portion, said seating means being movable from a storage position adjacent to its respective said second portion to a substantially horizontal position extending inwardly beyond its respective truck bed side wall at approximately the top of said truck bed side wall and vertically spaced from its respective said first wall portion a sufficient distance to accommodate the body portion of seated human passengers adjacent its said respective second portion and outwardly of its said respective first portion and outwardly of its respective truck bed side wall, and upon inversion of the body said top and side walls forming a cargo carrier, said second side wall portion to which said seating means is attached being stationary and serving as a back to said seating means, said body when in upright position providing a space extending from the truck bed bottom to said body top.

8. A truck which comprises an open top truck bed having a bottom and vertically positioned side walls, a convertible body on said bed having a closed top, an open bottom and side walls extending from said top, said body side walls having adjacent said top first portions whose outside dimensions permit, upon inversion of said body, close insertion within the respective side walls of said truck bed, seating means pivotally attached to a body side wall, said seating means having support means for holding said seating means in a substantially horizontal position extending inwardly beyond its respective truck bed side wall at approximately the top of said truck bed side wall and vertically spaced from said body top a sufficient distance to accommodate the body portions of seated human passengers between said seating means and said body top, said side wall being stationary on said body and serving as a back to said seating means, said seating means being pivotable towards said open bottom to a position forming an extension of its respective said side wall when said body is in inverted position, means for holding said seating means in extended position, and said seating means being pivotable from the horizontal to a storage position towards said closed top and adjacent its responsive said body side wall.

9. A truck which comprises a truck bed having a bottom, vertically positioned side walls and outwardly extending projections at the upper ends of said side walls, a body on said bed having a top, an open bottom and side walls extending from said top, said side walls having adjacent said top first portions whose outside dimensions permit, upon inversion of said body, insertion within the respective sides of said truck bed, second side wall portions being outwardly from their respective said first wall portions, seating means attached to said second wall portions and being movable to a storage position adjacent the inside of said second wall portions, said seating means having support means for holding said seating means in a substantially horizontal position vertically spaced from said first portions to accommodate seated passengers adjacent said second portions and outwardly of said respective first portions, said seating means being movable to a position forming extensions of said body side walls upon inversion of said body, and means on said side walls for holding said support means in extended position, said body when in upright position having said second portions on said outward projections of said vertically positioned side walls and providing a space extending from the truck bed bottom to said body top.

10. A truck which comprises a truck bed having a bottom, vertically positioned side walls and outwardly extending projections at the upper ends of said side walls, a body on said bed having a top, an open bottom and side walls extending from said top, said side walls having adjacent said top first portions whose outside dimensions permit, upon inversion of said body, insertion within the respective sides of said truck bed, second side wall portions being outwardly from their respective said first portions, seating means attached to said second wall portions, said seating means being movable from a storage position adjacent said second wall portions to substantially horizontal positions vertically spaced from said first portions to accommodate seated passengers adjacent said second portions and outwardly of said respective first portions, and upon inversion of the body, said top and first portions of said body side walls resting within the side walls of said truck bed to form a cargo carrier, said body when in upright position having said second portions on said outward projections of said vertically positioned side walls and providing a space extending from the truck bed bottom to said body top.

11. The body of claim 10 having a front wall and door means forming a rear wall.

12. A truck which comprises a truck bed having a bottom, vertically positioned side walls and outwardly extending projections at the upper ends of said side walls, a body on said bed having a top, an open bottom and side walls extending from said top, said side walls having adjacent said top first portions whose outside dimensions permit, upon inversion of said body, insertion within the sides of said truck bed, second portions of said body side walls being outwardly from said first portions so that said second portions are substantially in line with the outside of the outwardly extending projections on said bed side walls, seating means extending longitudinally of said body and pivoted to said second side wall portions of said body, said seating means being movable from a storage position adjacent said second side wall portions to a substantially horizontal position for accommodating passengers, said seating means also being further movable to a position forming extensions of said side walls upon inversion of said body, said seating means when in said substantially horizontal position overlying said outwardly extending projections on said bed side walls, transverse slots in the underside of said seating means, supports for said seating means having pivotal attachments in said transverse slots and holding said seating means in substantially horizontal position by contacting the inside of said truck bed side walls when said pivotal attachments are at a first end of said slots and longitudinally spaced strengthening supports enclosing said top and side walls, said seat supports being insertable into said strengthening supports by moving said pivotal attachments to the second end of said slots to secure said seating means in extended position upon inversion of said body whereby said top and first portions of said body side walls rest within the side walls of said truck bed to form a cargo carrier, said body when in upright position providing a space extending from the truck bed bottom to said body top.

References Cited in the file of this patent

UNITED STATES PATENTS

| | | |
|---|---|---|
| 709,705 | Grosvenor et al. | Sept. 23, 1902 |
| 1,229,223 | Burr | June 12, 1917 |
| 1,532,128 | Fletcher | Apr. 7, 1925 |
| 2,173,076 | Stetson | Sept. 12, 1939 |
| 2,535,242 | Stuart | Dec. 26, 1950 |
| 2,848,274 | Geisler et al. | Aug. 19, 1958 |
| 2,856,225 | Selzer | Oct. 14, 1958 |

FOREIGN PATENTS

| | | |
|---|---|---|
| 45,124 | Norway | Apr. 30, 1928 |